Patented Nov. 26, 1940

2,223,329

UNITED STATES PATENT OFFICE 2,223,329

ORGANIC PHOSPHATES

Clarence L. Moyle, Midland, Mich., assignor to The Dow Chemical Company, Midland, Mich., a corporation of Michigan No Drawing. Application May 4, 1939,
Serial No. 271,803

12 Claims. (Cl. 260—461)

This invention concerns certain new organic phosphates prepared from carbalkoxy and carbaryloxy phenols. The terms "carbalkoxy" and "carbaryloxy" phenols, as herein employed, refer to such compounds as amyl salicylate, phenyl salicylate, ethyl ester of 4-hydroxy-benzoic acid, methyl ester of 3-hydroxy-benzoic acid, and the like. The new compounds with which the invention is particularly concerned have the general formula

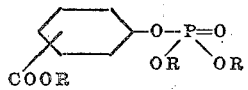

wherein each R represents an alkyl or aromatic radical.

Mixed organic phosphates having the above general formula may be prepared by reacting a phosphorus oxyhalide successively with a carbalkoxy or carbaryloxy phenol or an alkali salt thereof and at least one other phenol or alcohol, e. g., phenol, tertiarybutyl-phenol, halo-phenol, naphthol, guaiacol, para-xenol, tertiarybutyl alcohol, and the like, or the alkali metal salts thereof. The order in which the two hydroxyl-bearing compounds are reacted with the phosphorus oxyhalide is immaterial, although I find it convenient in the preparation of the mixed phosphates to start with known aryl or alkyl phosphoric acid halides, as desired, and to react such acid halide with the carbalkoxy or carbaryloxy phenol to form the desired mixed phosphate product. Tri-carbalkoxy and tri-carbaryloxy phenol phosphates are prepared by reacting sufficient of the ester phenol compound with a phosphorus oxyhalide to form the desired product.

According to the invention, a mixture of the appropriate reactants are heated to a reaction temperature, preferably in the presence of a reaction catalyst such as metallic calcium, magnesium, or aluminum, a chloride of magnesium, aluminum, or iron, etc. The temperature of the reaction is, of course, dependent in any case upon the reactants employed, the relative proportions thereof, the presence or absence of a catalyst, etc. Since, however, the reaction is accompanied by an evolution of hydrogen halide when the phenols themselves are used, it is usually sufficient merely to heat the reaction mixture to a temperature at which hydrogen halide is evolved, generally below 200° C. At higher temperatures, by-product formation and decomposition of the carbalkoxy and carbaryloxy phenols may occur to an objectionable extent.

Following completion of the heating step, air may be bubbled through the hot reaction mixture to remove hydrogen halide and other volatile impurities therefrom. The mixture may then be washed with water or dilute acid or alkali to remove residual catalyst, unreacted phenols, and/or phosphoric acid halides. If desired, the final product may be fractionally distilled to obtain the desired phosphate compound in substantially pure form. As these particular phosphates, however, show a tendency to decompose at distillation temperatures, the crude reaction mixture may be dried after washing and used as such. The compounds so obtained have been found valuable as modifying agents in plastic compositions, as addition agents to petroleum compositions, and as insecticidal toxicants.

The following examples illustrate certain embodiments of my invention but are not to be construed as limiting the same:

Example 1

269 grams (1 mol) of diphenyl phosphoric acid monochloride (boiling point 236°–245° C. at 8.6 millimeters pressure), 152 grams (1 mol) of methyl salicylate, and 2 grams of magnesium chloride were mixed together and heated at a temperature gradually increasing from 108° to 156° C. over a period of 5.5 hours, at the end of which time 0.864 mol of hydrogen chloride had been evolved from the reaction mixture. The 390 grams of crude phosphate product so obtained was cooled to 40° C., diluted with an equal weight of orthodichloro benzene, and washed successively with 2 per cent aqueous hydrochloric acid and water. The washed solution was thereafter dried and fractionally distilled, whereby there was obtained 322 grams of (2-carbomethoxy-phenyl) diphenyl phosphate as a pale yellow colored, mobile liquid smelling faintly of methyl salicylate, having a density of 1.270 at 25°/25° C., and boiling at 254°–265° C. at 7.6 millimeters pressure.

Example 2

A mixture of 245.5 grams (1 mol) of 2-chlorophenyl phosphoric acid dichloride (boiling at 206°–211° C. at 6.1 millimeters pressure), 334.4 grams (2.2 mols) of methyl salicylate, and 1 gram of magnesium chloride was heated with stirring for 4 hours at 119° to 162° C. The crude reaction product was thereafter washed, as described in Example 1, and fractionally distilled, whereby there was obtained 200 grams of (2-chlorophenyl) di-(2-carbomethoxy-phenyl) phosphate boiling at 304°–315° C. at 7.6 millimeters pressure and having a density of 1.372 at 25°/25° C.

Example 3

In a similar manner, 1 mol of 4-tertiarybutyl-phenyl phosphoric acid dichloride was reacted with 2 mols of amylsalicylate to obtain a crude (4 - tertiarybutylphenyl) di - (2 - carbamyloxy - phenyl) phosphate product as a mobile, brown liquid which decomposed on attempted distillation.

Example 4

Likewise, a (2-carbisobutoxy-phenyl) di-(2-xenyl) phosphate product was prepared from isobutyl salicylate and di-(2-xenyl) phosphoric acid monochloride. Distillation of the crude reaction mixture yielded a viscous, yellow liquid boiling with some decomposition at 333°–337° C. at 7.6 millimeters pressure. This fraction, upon standing, yielded a crystalline material melting at 99°–102° C.

Example 5

1 mol of phosphorous oxychloride was reacted with 3 mols of the hexyl ester of 4-hydroxy-benzoic acid to obtain a crude tri-(4-carbohexoxy-phenyl) phosphate product as a mobile, yellow liquid having a refractive index of $$1.5234 n_D^{25}$$

and decomposing upon attempted distillation.

Representative of other organic phosphates prepared in a similar manner are the following:

Tri-(2-carbomethoxy-phenyl) phosphate, a viscous, yellow oil boiling at 294°–309° C. at 7.6 millimeters pressure and having a density of 1.311 at 25°/25° C.

Di-(2-carbomethoxy-phenyl) phenyl phosphate, a yellow liquid boiling at 274°–278° C. at 5 millimeters pressure and having a density of 1.308 at 25°/25° C.

(4-tertiarybutyl-phenyl) di-(carbomethoxy-phenyl) phosphate, a viscous, straw-colored liquid boiling at 304°–315° C. at 7.8 millimeters pressure and having a density of 1.372 at 25°/25° C.

(2-carbomethoxy-phenyl) di-(2-xenyl) phosphate as a viscous, yellow liquid boiling at 340°–351° C. at 8.1 millimeters pressure and having a density of 1.270 at 25°/25° C.

In a similar manner, the phenyl, chlorophenyl, tertiarybutyl-phenyl, 2-methoxy-phenyl, xenyl, naphthyl, propyl, tertiaryoctyl, and hexadecyl esters of 2-, 3- and 4-hydroxy-benzoic acid may be reacted with phosphorous oxychloride or with such phosphoric acid halides as naphthyl-phosphoric acid dichloride, mono- and di-tolyl phosphoric acid halides, (tolyl) (butyl) phosphoric acid monohalide, diethyl phosphoric acid monohalide, di-tertiarybutyl phosphoric acid monohalide, monobutyl phosphoric acid dihalide, etc., to obtain compounds similar to those set forth in the examples.

Other modes of applying the principle of my invention may be employed instead of those explained, change being made as regards the materials employed, provided the products described in the following claims be thereby obtained.

I therefore particularly point out and distinctly claim as my invention:

1. An organic phosphate having the formula

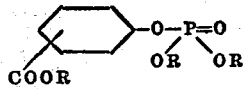

wherein each R represents a member of the group consisting of alkyl and aromatic radicals.

2. An organic phosphate having the formula

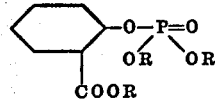

wherein each R represents a member of the group consisting of alkyl and aromatic radicals.

3. An organic phosphate having the formula

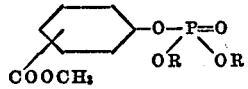

wherein each R represents a member of the group consisting of alkyl and aromatic radicals.

4. An organic phosphate having the formula

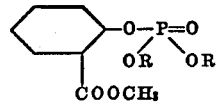

wherein each R represents a member of the group consisting of alkyl and aromatic radicals.

5. An organic phosphate having the formula

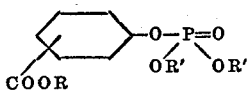

wherein R represents an alkyl radical, and each R' represents an aromatic radical.

6. An organic phosphate having the formula

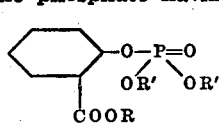

wherein R represents an alkyl radical and each R' represents an aromatic radical.

7. An organic phosphate having the formula

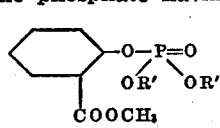

wherein each R' represents an aromatic radical.

8. A tri-(carbalkoxy-phenyl) phosphate.

9. Tri-(2-carbomethoxy-phenyl) phosphate.

10. (2-carbomethoxy-phenyl) diphenyl phosphate.

11. Di-(2-carbomethoxy-phenyl) phenyl phosphate.

12. An organic phosphate having the formula

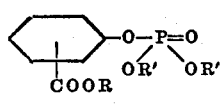

wherein R represents an alkyl radical and each R' represents a member of the group consisting of alkyl and aromatic radicals.

CLARENCE L. MOYLE.